United States Patent [19]
Itoga et al.

[11] Patent Number: 5,122,729
[45] Date of Patent: Jun. 16, 1992

[54] POWER SUPPLY DEVICE INCLUDING INDUCTION VOLTAGE DETECTION COIL FOR CHARGING PORTABLE ELECTRONIC DEVICES

[75] Inventors: Toshiyuki Itoga, Nara; Masataka Ueki, Nigata, both of Japan

[73] Assignees: Sharp Kabushiki Kaisha, Osaka; Ueyama Corp., Nigata, both of Japan

[21] Appl. No.: 636,620

[22] Filed: Jan. 2, 1991

[30] Foreign Application Priority Data

Jan. 8, 1990 [JP] Japan .................................. 2-1310

[51] Int. Cl.⁵ ............................................ G05B 24/02
[52] U.S. Cl. ............................. 323/347; 336/DIG. 2
[58] Field of Search .................... 219/10.77; 323/264, 323/347; 363/15, 16, 95, 97, 123, 131, 178; 336/DIG. 2

[56] References Cited

U.S. PATENT DOCUMENTS

| | | | |
|---|---|---|---|
| 4,463,353 | 7/1984 | Kuzara | 340/825.54 |
| 4,795,898 | 1/1989 | Bernstein et al. | 235/487 |
| 4,797,541 | 1/1989 | Billings | 363/97 |
| 4,924,171 | 5/1990 | Baba et al. | 323/347 |

Primary Examiner—J. L. Sterrett
Attorney, Agent, or Firm—Nixon & Vanderhye

[57] ABSTRACT

A power supply device has a primary coil, a detection coil and a controller. The detection coil detects and outputs as a change in induction voltage any load fluctuation resulting from change in distance between the primary coil and a secondary coil. The controller controls, based on the change in the induction voltage output by the detection coil, an output of an oscillation circuit to hold power supplied to the secondary coil to a constant level. Therefore, even if the distance between the primary coil and the secondary coil changes, power supplied to battery connected to the secondary coil is stable. In particular, when the distance between the primary coil and the secondary coil becomes far, the controller increases the output of the oscillation circuit.

8 Claims, 3 Drawing Sheets

POWER SUPPLY DEVICE INCLUDING INDUCTION VOLTAGE DETECTION COIL FOR CHARGING PORTABLE ELECTRONIC DEVICES

BACKGROUND OF THE INVENTION

The present invention relates to a power supply device which supplies power by a non-contact means using electromagnetic induction to portable electronic devices.

Portable electronic devices enabling data entry from a remote location not directly connected to a power supply have become common in recent years. As shown in FIG. 5, an example of such a device is a portable terminal 101 used together with an optical signal distribution device 102. With the device, the user usually enters data through a keyboard 101a of the portable terminal 101, and the data is stored to an internal storage medium. The portable terminal 101 is then set on the optical signal distribution device 102 to transmit the stored data from the portable terminal 101 to the optical signal distribution device 102 by means of an optical signal. Due to the need for portability, this portable terminal 101 uses a built-in rechargeable battery as the power supply. In addition, as shown in FIG. 4, a primary coil 106 and oscillation circuit 108 are provided on the top of the optical signal distribution device 102, and a secondary coil 107 is provided on the bottom of the portable terminal 101. It is to be noted that the primary coil 106 and the secondary coil 107 are respectively wound around a core 110 and core 111.

When the battery is to be recharged, power is applied from the oscillation circuit 108 to the primary coil 106, and power is supplied using non-contact electromagnetic induction to the secondary coil 107 of the portable terminal 101 to recharge the built-in battery. By thus supplying power using a non-contact means, problems, such as poor contact, which tend to occur when power is supplied through physical contact terminals can be avoided.

However, when supplying power as described above and the gap between the optical signal distribution device 102 and the portable terminal 101 set thereon, specifically the distance between the primary coil 106 and the secondary coil 107, changes due to vibrations or other external causes, the power supplied to the secondary coil 107 can vary greatly, preventing a stable power supply. As a result, the distance between the primary coil 106 and the secondary coil 107 must be less than 1 mm for a sufficient power supply to be assured.

SUMMARY OF THE INVENTION

Therefore, a primary object of the present invention is to provide a power supply device which can stably maintain a sufficient power supply even with a non-contact connection to a portable terminal as described above and other portable electronic devices.

In order to achieve the above object, the power supply device of the present invention, as shown in FIG. 1 which shows the concept of the power supply device, applies power from an oscillation circuit 10 to a primary coil 3 and supplies power by means of non-contact electromagnetic induction to a secondary coil 7 juxtaposed to the primary coil 3, and is characterized by a detection coil 12 which is connected by electromagnetic induction to the primary coil 3, detects a load fluctuation resulting from and varying according to a change in a distance between the primary coil 3 and secondary coil 7, and outputs a signal representing the load fluctuation as a change in an induction voltage, and a control means 4 which controls, based on the change in the induction voltage output by the detection coil 12, an output of the oscillation circuit 10 so that the power supplied to the secondary coil 7 remains constant.

The detection coil 12 detects and outputs as a change in the induction voltage any load fluctuation resulting from a change in the distance between the primary coil 3 and the secondary coil 7. The control means 4 controls, based on the change in the induction voltage output by the detection coil 12, the output of the oscillation circuit 10 to hold to a constant level the power supplied to the secondary coil 7. Therefore, even if the distance between the primary coil 3 and the secondary coil 7 changes, the power supplied to a battery connected to the secondary coil 7 is stable. In particular, when the distance between the primary coil 3 and the secondary coil 7 becomes far, the control means 4 increases the output of the oscillation circuit 10. Therefore, the power supply to the secondary coil 7 and to the battery connected thereto remains stable and sufficient.

Because a power supply device according to the present invention provides a detection coil, detects load fluctuation as a change in the induction voltage based on the electromagnetic induction from a primary coil, and controls based on this change in the induction voltage the output of an oscillation circuit by means of a control means to maintain the power supplied to a secondary coil at a stable level, sufficient power can be stably supplied by a non-contact connection to portable electronic devices, for example, portable data terminals.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

A preferred embodiment of a power supply device according to the present invention is described hereinbelow.

Figure 1:
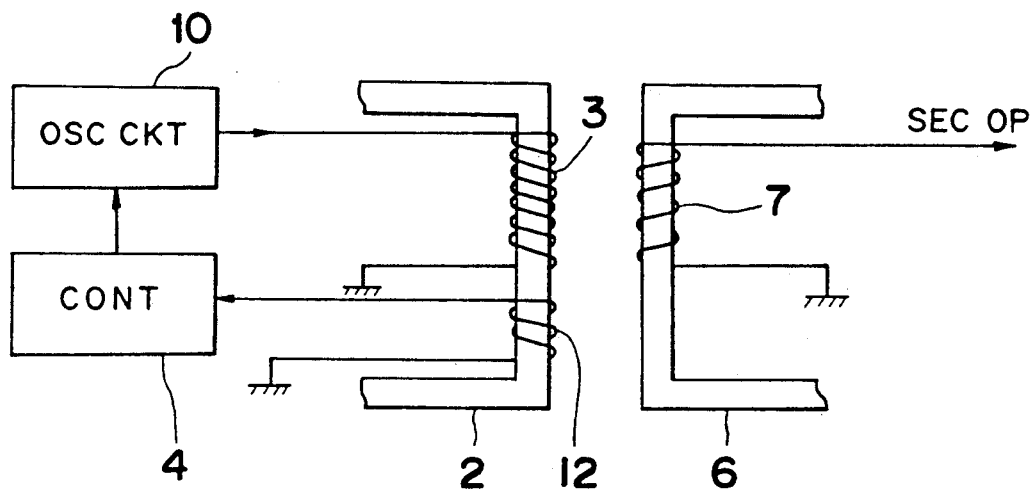
FIG. 1 is a schematic diagram of the construction of a power supply device according to the present invention.
Figure 2:
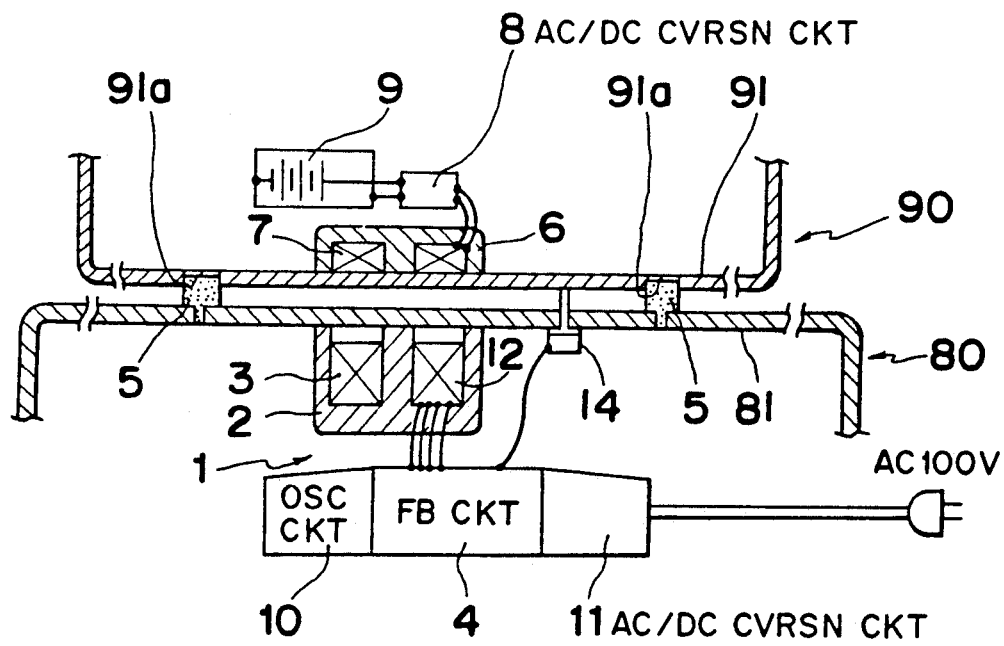
FIG. 2 is a cross section showing the construction of an optical signal distribution device provided with a power supply device according to a preferred embodiment of the present invention, and a portable terminal which receives a power supply from this optical signal distribution device.

Shown in FIG. 2 is a cross section of a optical signal distribution device 80 and a portable terminal 90 which is set on top of this optical signal distribution device 80. The optical signal distribution device 80 has a power supply device 1 on the top. This power supply device 1 comprises a primary coil 3 and a detection coil 12 wrapped around a core 2, an oscillation circuit 10, and a feedback circuit 4 as a control means. A DC voltage is supplied to the feedback circuit 4 from a commercial AC power supply (100 VAC) through an AC/DC conversion circuit 11. The primary coil 3 and detection coil 12 are mounted with the core 2 integrally to the top cover 81 of the optical signal distribution device 80.

Figure 3:
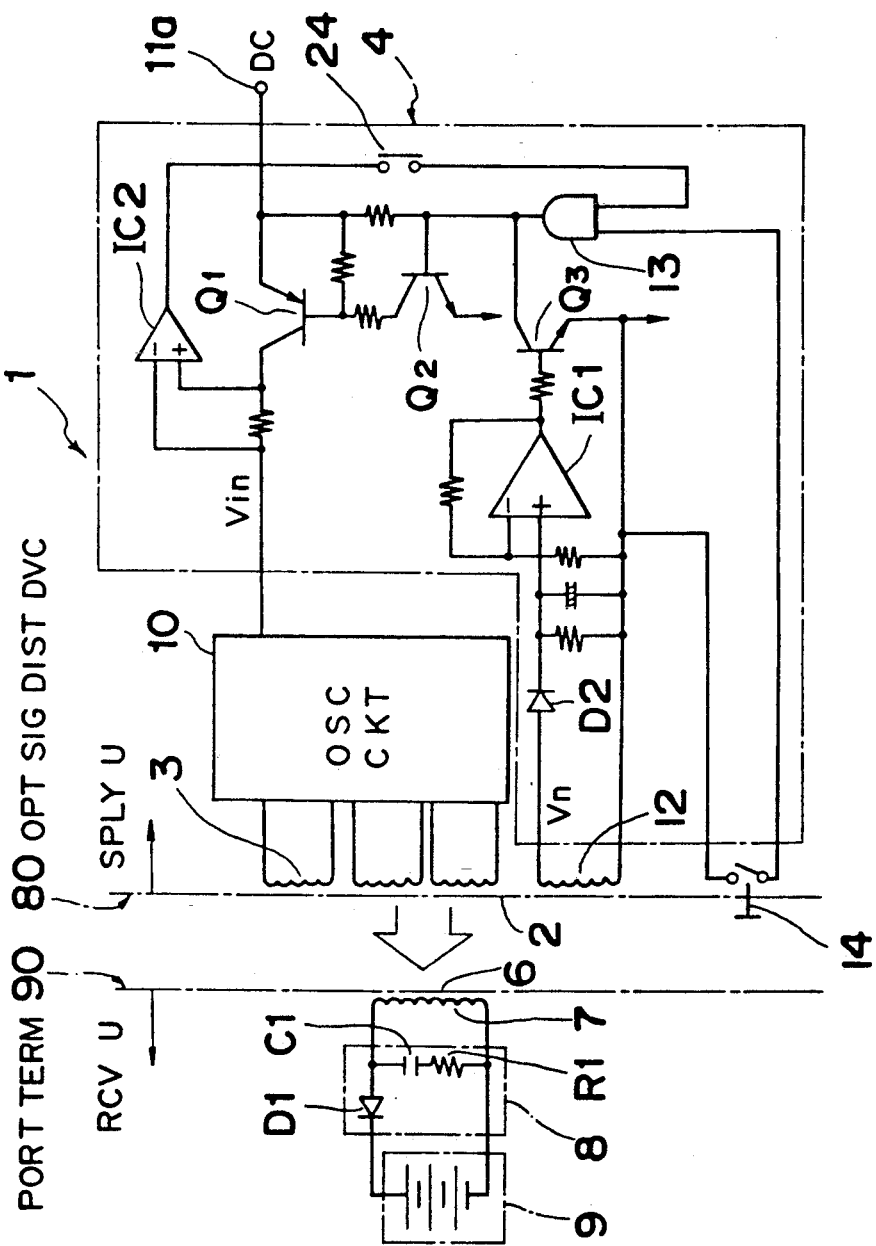
FIG. 3 is a circuit diagram of circuits in the above optical signal distribution device and portable terminal.
Figure 4:
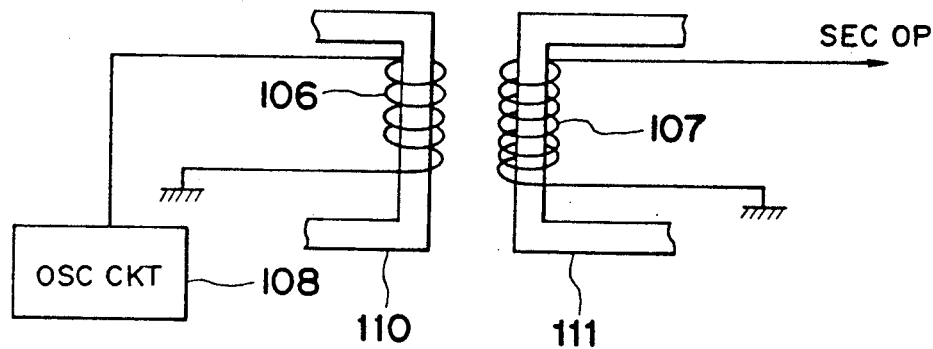
FIG. 4 shows a conventional power supply device.
Figure 5:
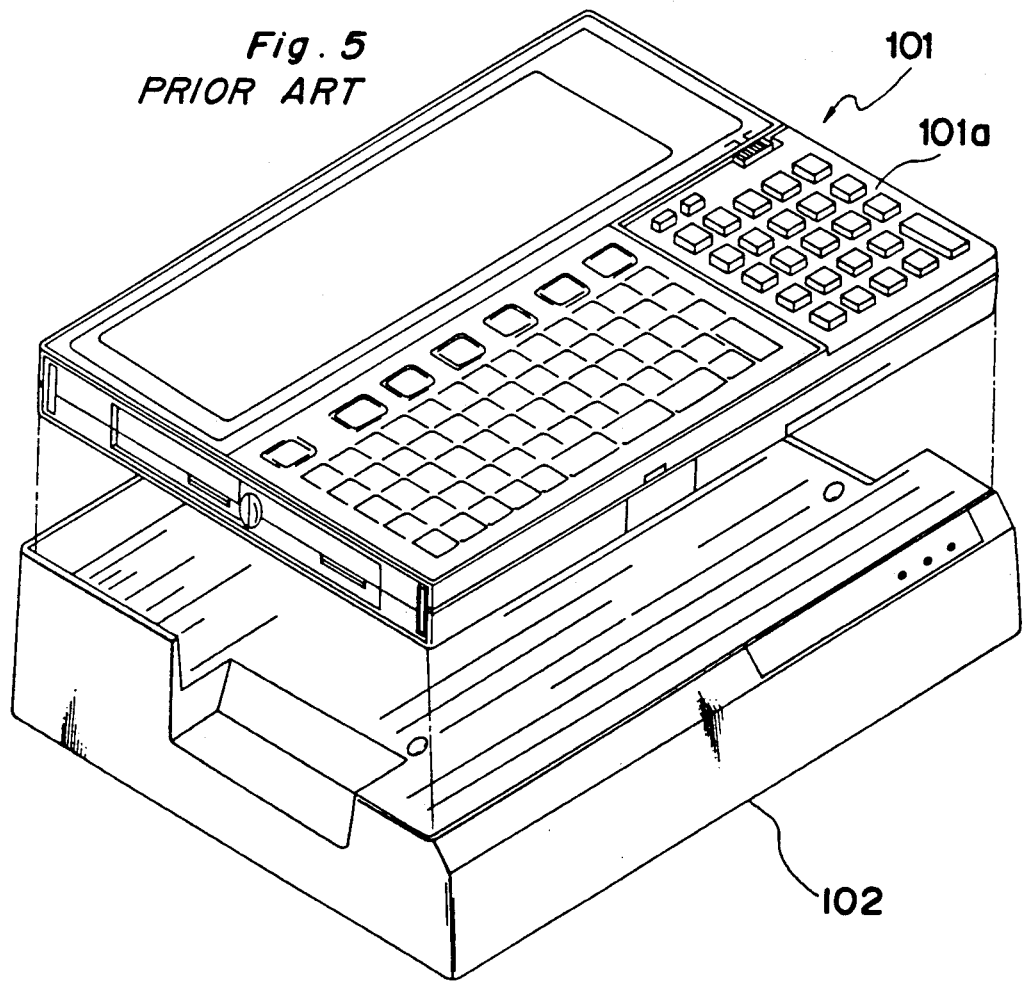
FIG. 5 is a perspective view of an optical signal distribution device and portable terminal.

The portable terminal 90 comprises a rechargeable battery 9, secondary coil 7 wrapped around a core 6, and an AC/DC conversion circuit 8 connected between the rechargeable battery 9 and the secondary coil 7. As shown in FIG. 3, the AC/DC conversion circuit 8 comprises a serially connected capacitance C1 and resistance R1, and a diode D1, and converts the AC voltage induced to the secondary coil 7 to a DC voltage to output it to the rechargeable battery 9.

The secondary coil 7 is mounted with the core 6 integrally to the bottom plate 91 of the portable terminal 90 as shown in FIG. 2. Recess portions 91a are provided on the outside of the bottom plate 91, and the recess portions 91a fit with positioning pins 5 projecting from the outside of the top cover 81 of the optical signal distribution device 80. When the portable terminal 90 is set on the optical signal distribution device 80 so that the recess portions 91a and positioning pins 5 fit together, the secondary coil 7 of the portable terminal 90 and the primary coil 3 of the optical signal distribution device 80 are in opposition and connected by means of electromagnetic induction. It is to be noted that a switch 14 is provided to detect whether the portable terminal 90 is in position on the top cover 81 of the optical signal distribution device 80. The switch 14 becomes off state when the the portable terminal 90 is in position on the top cover 81 of the optical signal distribution device 80.

The power supply device 1 is constructed as shown in FIG. 3. The oscillation circuit 10 receives voltage Vin from the feedback circuit 4, and outputs to the primary coil 3 an oscillation output with an amplitude corresponding to the strength of voltage Vin. It is to be noted that the internal structure of the oscillation circuit 10 is an open magnetic path, and the oscillation frequency and output therefore change according to fluctuations in the load.

The feedback circuit 4 comprises a diode D2, differential amplifier IC1, transistors Q3, Q2, and Q1, differential amplifier IC2, AND circuit 13, delay switch 24 and other resistances and a capacitance. The delay switch 24 is interlocked to the switch 14. The voltage induced by the detection coil 12 is received, and frequency voltage conversion is performed by the diode D2 and differential amplifier IC1. By controlling the base voltage of transistor Q2 by means of transistor Q3, the collector current of transistor Q1 is controlled, and the voltage Vin applied to the oscillation circuit 10 is controlled.

When the rechargeable battery 9 built-in to the portable terminal 90 is to be recharged, the portable terminal 90 is first set on the optical signal distribution device 80 in the required position, i.e., with the recess portions 91a and positioning pins 5 fit together. Thus, a signal indicating that the portable terminal 90 is set is input from the switch 14 to the feedback circuit 4, and the oscillation circuit 10 oscillates. Specifically, the AND circuit 13 first receives signals of "H" level from the switch 14 and the delay switch 24 of "off" state, and then receives a signal of "H" level from the switch 14 and a signal of "H" level from the differential amplifier IC2 through the delay switch 24 of "ON" state. Therefore, at this time, the AND circuit 13 outputs a signal of "H" level, and the oscillation circuit 10 oscillates. Then the output from the oscillation circuit 10 is applied to the primary coil 3, power is supplied by means of non-contact electromagnetic induction to the secondary coil 7 opposite the primary coil 3, and the rechargeable battery 9 is recharged via the AC/DC conversion circuit 8. When the distance between the portable terminal 90 and optical signal distribution device 80, i.e., the distance between the primary coil 3 and the secondary coil 7, changes due to ambient vibrations or another cause, the load fluctuates and the oscillation frequency and output of the oscillation circuit 10 change. At this time, the detection coil 12 detects this load fluctuation from the primary coil 3, and outputs this fluctuation as a change in the induction voltage. Thus the feedback circuit 4 detects the change in the induction voltage output by the detection coil 12, and controls the output of the oscillation circuit 10 so that the power supplied to the secondary coil 7 remains constant. Therefore, when the distance between the primary coil 3 and the secondary coil 7 changes due to ambient vibrations or another cause, the change in the supply power to the rechargeable battery 9 can be suppressed, and the power can be supplied stably. In particular, even if the distance between the primary coil 3 and the secondary coil 7 becomes far, sufficient power can be supplied to the rechargeable battery 9. In actual measurements, it was confirmed that a 10-V, 200-mA current could be stably supplied with a between-coil distance of 0.5 mm to 3 mm.

It is to be noted that when the rechargeable battery 9 of the portable terminal 90 is fully charged, the load is reduced to the lowest level and the electric current flowing in the primary coil 3 decreases. Therefore, by driving the transistor Q3 and controlling a current flowing to the base of the transistor Q1 based on an induction current of the detection circuit 12 detected by the differential amplifier IC1, it is possible to stop the oscillation circuit 10 from oscillation.

It is to be noted that in this preferred embodiment the power supply device 1 is provided in the optical signal distribution device 80 to recharge a portable terminal 90, but it will be obvious that the invention is not so limited and can also be applied to recharging other portable electronic devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply device which applies power from an oscillation circuit to a primary coil and supplies power by means of non-contact electromagnetic induction to a secondary coil juxtaposed to the primary coil, said device further comprising:

a detection coil which is inductively connected to the primary coil and responsive to a variation in magnetic flux of an alternating signal applied to said primary coil, for detecting a load fluctuation resulting from and varying in accordance with a said secondary coil, and for outputting a voltage signal representing the load fluctuation as a change in an induction voltage induced in said detection coil, and a control means which controls, based on the change in the induction voltage output by the detection coil, an output of said oscillation circuit so that the power supplied to the secondary coil remains constant.

2. The power supply device according to claim 1, further comprising a switch which outputs a signal to the control means for driving the oscillation circuit when a device containing the secondary coil is in a juxtaposed position to the power supply device.

3. The power supply device according to claim 1, further comprising a differential amplifier which detects a power supplied to the oscillation circuit, and outputs to the control means a signal for stopping oscillation of the oscillation circuit when the power is smaller than a predetermined value.

4. The power supply device according to claim 2, further comprising a differential amplifier which detects a power supplied to the oscillation circuit, and outputs to the control means a signal for stopping oscillation of the oscillation circuit when the power is smaller than a predetermined value.

5. In combination, a power supply device detachably connected to a portable electronic terminal device for supplying power for charging a rechargeable battery included in said terminal device by non-contact electromagnetic induction, comprising:

a secondary coil in said terminal device connected to said battery;

said power supply device further including a primary coil juxtaposed to said secondary coil, an oscillation switch, a detection coil inductively coupled to said primary coil and detection coil inductively coupled to said primary coil and responsive to a variation in magnetic flux of an alternating signal applied to said primary coil by said oscillation circuit for detecting a load fluctuation resulting from and varying in accordance with a change in the distance between said primary coil and said secondary coil, and for outputting a voltage signal representing the load fluctuation as a change in an induction voltage induced in said detection coil, and a control means which controls, based on the change in the induction voltage output by the detection coil, an output of said oscillation circuit so that the power supplied to the secondary coil remains constant.

6. A combination as in claim 5, wherein said control means includes means for eliminating the supply of power to said terminal device when said battery is fully charged.

7. A combination as in claim 6 wherein said power supply device is included in an optical signal distribution device.

8. A combination as in claim 7 wherein said terminal device further includes a memory and a data entry means for storing data in said memory.

* * * * *